(12) United States Patent
Friederichs et al.

(10) Patent No.: US 12,371,448 B2
(45) Date of Patent: Jul. 29, 2025

(54) POST-METALLOCENE COMPOUNDS

(71) Applicant: SABIC GLOBAL TECHNOLOGIES B.V., Bergen op Zoom (NL)

(72) Inventors: Nicolaas Hendrika Friederichs, Brunssum (NL); Alexander Voskoboynikov, Moscow (RU); Dmitry Uborsky, Moscow (RU); Vincenzo Busico, Naples (IT); Roberta Cipullo, Naples (IT); Antonio Vittoria, Avella (IT); Dmitry Mladentsev, Moscow (RU); Georgy Goryunov, Moscow (RU)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 493 days.

(21) Appl. No.: 17/800,573

(22) PCT Filed: Apr. 13, 2021

(86) PCT No.: PCT/EP2021/059482
§ 371 (c)(1),
(2) Date: Aug. 18, 2022

(87) PCT Pub. No.: WO2021/213836
PCT Pub. Date: Oct. 28, 2021

(65) Prior Publication Data
US 2023/0106768 A1 Apr. 6, 2023

(30) Foreign Application Priority Data
Apr. 24, 2020 (EP) ..................................... 20171329

(51) Int. Cl.
| | | |
|---|---|---|
| C07F 7/28 | (2006.01) | |
| C07F 7/00 | (2006.01) | |
| C08F 4/659 | (2006.01) | |
| C08F 10/00 | (2006.01) | |
| C08K 3/10 | (2018.01) | |

(52) U.S. Cl.
CPC .................. *C07F 7/28* (2013.01); *C07F 7/00* (2013.01); *C08F 10/00* (2013.01); *C08F 4/65912* (2013.01)

(58) Field of Classification Search
CPC .................. C07F 7/00; C08F 2/04; C08K 3/10
See application file for complete search history.

(56) References Cited

U.S. PATENT DOCUMENTS
2020/0048383 A1  2/2020  Hule et al.

FOREIGN PATENT DOCUMENTS
| | | | | |
|---|---|---|---|---|
| CN | 109400642 A | 3/2019 | | |
| WO | WO-2011025053 A2 | * | 3/2011 | ............... C08F 18/02 |
| WO | WO-2018075243 A1 | * | 4/2018 | ............... C08F 210/16 |

OTHER PUBLICATIONS

Phrase Construction Searching (2011) (Year: 2011).*
P. D. Knight, et al, 7 Chemical Communications, 894-895 (2004) (Year: 2004).*
CAS abstract RN 712281-54-4 (Year: 2004).*
International Search Report for International Application PCT/EP2021/059482, International Filing Date Apr. 13, 2021, Date of Mailing Jul. 12, 2021, 7 pages.
Reybuck, S., et al. "Amine Bis(phenolate) Zirconium Complexes: Influence of Ligand Structure and Cocatalyst on Copolymerization Behavior" Macromolecules, 2005 (38) p. 2552-2558.
Tshuva, E. et al., "Novel zirconium complexes of amine bis(phenolate) ligands. Remarkable reactivity in polymerization of hex-1-ene due to an extra donor arm", Chemical Communications, 2000 (5), p. 379-380.
Tshuva. E., et al., [ONXO]-Type Amine Bis(phenolate) Zirconium and Hafnium Complexes as Extremely Active 1-Hexene Polymerization Catalysts, Organometallics 2002 (21) p. 662-670.
Written Opinion for International Application PCT/EP2021/059482, International Filing Date Apr. 13, 2021, Date of Mailing Jul. 12, 2021, 7 pages.

* cited by examiner

*Primary Examiner* — Alexander R Pagano
*Assistant Examiner* — Frank S. Hou
(74) *Attorney, Agent, or Firm* — CANTOR COLBURN LLP

(57) ABSTRACT

The present invention relates to a compound according to formula 1: wherein: •each of $R_1$ to $R_{12}$ may individually be a moiety selected from hydrogen, an aryl moiety, an aryl moiety, a halogen, an alkyl or aryl moiety with halogen substituent(s), an alkoxy moiety, a siloxy moiety, or a nitrogen-containing moiety, wherein each R moiety may optionally form a ring structure with an adjacent R moiety; •each of $A_1$ and $A_2$ may individually be a moiety selected from: o an element of Group 16 of the periodic system; and o a moiety containing an element of Group 15 of the periodic system; preferably wherein $A_1$ and $A_2$ are selected from O or $NR_{13}$, wherein $R_{13}$ is an alkyl, aryl or aralkyl moiety, preferably a substituted or unsubstituted phenyl moiety, preferably a p-tolyl moiety; •T is a divalent hydrocarbyl moiety; •D is a substituted element of Group 15 or Group 16 of the periodic system, preferably an $N(R_{14})_2$ or $OR_{14}$ moiety, in which $R_{14}$ is selected to be an alkyl moiety, an aryl moiety, or an aralkyl moiety, preferably $R_{14}$ is a methyl moiety; •Y is an element selected from Group 15 of the periodic system, preferably N; •Mt is a transition metal, preferably selected from Group 3 or 4 of the periodic system, more preferably selected from Ti, Hf and Zr; •X is a sigma-bonded ligand, preferably selected from a halogen, an alkyl moiety, an aralkyl moiety, an alkoxy moiety, an aryloxy moiety, and a dialkylamine moiety; and Classification: General Business Use •n is the amount of X ligands bonded to X. Such compound allow for use in catalysts that result in high molecular weight polymers, display high catalyst activities and give excellent comonomer incorporation.

17 Claims, No Drawings

POST-METALLOCENE COMPOUNDS

CROSS REFERENCE TO RELATED APPLICATIONS

This application is a National Stage application of PCT/EP2021/059482, filed Apr. 13, 2021, which claims the benefit of European Application No. 20171329.4, filed Apr. 24, 2020, both of which are incorporated by reference in their entirety herein.

FIELD

The present invention relates to post-metallocene compounds. The invention also relates to the application of such compounds in catalytic systems suitable for use in polymerisation, such as in polymerisation of olefins. Such catalytic systems allow for the production of polymers having high molecular weight, at particular high polymerisation activity, as well as high degree of incorporation of desired comonomers in copolymerisation reaction of olefins.

BACKGROUND

Polymers of ethylene and other olefins are ubiquitously available and find widespread applications. Examples of typical olefin-based polymers include various types of polymers that are produced by reaction of a particular reaction mixture in the presence of a catalytic system. Examples of ethylene-based copolymers include for example medium-density polyethylenes (MDPE), linear low-density polyethylenes (LLDPE), polyolefin plastomers (POP), polyolefin elastomers (POE), and ethylene-propylene-diene terpolymers (EPDM). Such polymers are typically produced using transition-metal based catalyst systems. In order for these polymers to qualify as suitable materials for applications with significant commercial importance, the polymers have to have a particular molecular weight, expressed as the weight-average molecular weight ($M_w$), such as of at least 10 kg/mol, preferably of at least 50 kg/mol, but even more preferably of at least 100 kg/mol, and may for example be in the range of between 100 kg/mol and 500 kg/mol, to provide a polymeric product that demonstrates desirable product qualities in combination with processability via melt shaping processes, as typically used in shaping of products based on polymeric materials.

In addition, a further ethylene-based polymer produced using catalytic systems is high-density polyethylene (HDPE), such as for example bimodal HDPE, which is used in for example certain high demanding applications as pressure pipes. Such bimodal HDPE typically comprises a low molecular weight fraction of ethylene homopolymer, and a high molecular weight fraction ethylene-based copolymer. The high molecular weight fraction of such bimodal HDPE typically has an $M_w$ of above 100 kg/mol, even above 300 kg/mol, or even above 500 kg/mol.

Also, a further commercial type of polyethylene is ultra-high molecular weight polyethylene (UHMWPE), having a typical molecular weight of even above 1000 kg/mol, which finds its application in high-performance applications.

In order to commercially manufacture olefin-based polymers such as those referred to above, and therein providing improved process economics in the world-scale polymerisation operations in which such polymers are produced, as well as improvements in the quality of the products and the properties of the products, there remains a continued drive to develop catalyst systems to contribute thereto.

Particular aspects pertaining to the catalyst system employed in the polymerisation of olefins include the activity of the catalyst, the ability of incorporation of comonomers, and the ability to produce a polymer product having a high molecular weight. The activity of the catalyst indicates the quantity of polymeric product that is obtained per quantity of catalyst used. The ability of comonomer incorporation indicates the quantity of comonomer that is reacted into the polymer when polymerisation takes place at a given quantity of comonomer present in the reaction mixture; due to lesser reactivity of the comonomer vis-à-vis the main monomer. Therein, it is desirable to increase the reactivity of the comonomers, so that the concentration of the comonomer content in the reaction mixture can be minimised, which is required from process optimisation and economics perspective.

A further known trend in preparation of polymers based on olefins, in particular in preparation of copolymers based on ethylene and α-olefins such as α-olefins comprising 3-10 carbon atoms, is that the molecular weight of the obtained copolymer decreases with an increase of the content of the comonomer that is built into the polymer chains. The challenge that therefore continues to be present is to combine the desirable incorporation of the comonomers in the polymerisation of e.g. ethylene with the desirable high molecular weight.

Various types of catalysts have been developed over the years and have found commercial implementation in various process concepts of polymerisation, and are widely disclosed in literature. A particular group of catalysts are single-site catalysts. In such catalyst compound, a single catalytically active specie is present, which translates into a narrow polydispersity, which is defined as the molecular weight distribution ($M_w/M_n$), and a narrow composition distribution, which tend to result in particularly desirable mechanical properties of the obtained polymers.

This category of single-site catalysts includes the group of catalysts referred to as post-metallocene catalysts. Such post-metallocenes are to be understood to be compounds comprising a discrete transition metal compound, wherein the compound does not comprise cyclopentadienyl or substituted cyclopentadienyl moieties, which are present in metallocene catalysts.

Particularly interesting post-metallocenes are transition metal compounds containing amine-bisphenolate ligands. Transition metal compounds containing amine bisphenolate ligands are known. In such complexes, the amine group that connects the aromatic rings of the two phenolate moieties, is typically substituted via a hydrocarbon spacer to an electron donating group that can coordinate to the transition metal. For instance, in Chemical Communications, 2000 (5), p. 379-380 and in Organometallics 2002 (21) p. 662-670 by Kol et al. and in Macromolecules, 2005 (38) p. 2552-2558 by Waymouth et al., such amine bis(phenolate) zirconium compounds are described, as well as their abilities to act as catalysts for olefin polymerizations. These publications all teach that is these amine bisphenolate compounds, the nitrogen is connected to the aromatic moieties of the phenolate groups via a spacer, typically a divalent hydrocarbyl group, like for example a methylene spacer.

SUMMARY

Still, there is a need to broaden the performance scope of catalysts, which are able to produce amorphous or semi-crystalline polyolefins in high yield, having a high reactivity for comonomer incorporation (like for example copolymerization of ethylene with 1-hexene or other sterically encumbered olefins) and which is still giving high molecular weight copolymers.

This is now achieved according to the present invention by a compound according to formula 1:

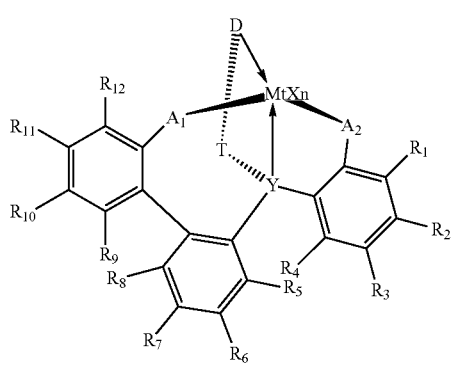

formula 1 wherein:
each of $R_1$ to $R_{12}$ may individually be a moiety selected from hydrogen, an aryl moiety, an aryl moiety, a halogen, an alkyl or aryl moiety with halogen substituent(s), an alkoxy moiety, a siloxy moiety, or a nitrogen-containing moiety, wherein each R moiety may optionally form a ring structure with an adjacent R moiety;
each of $A_1$ and $A_2$ may individually be a moiety selected from:
an element of Group 16 of the periodic system; and
a moiety containing an element of Group 15 of the periodic system;
preferably wherein $A_1$ and $A_2$ are selected from O or $NR_{13}$, wherein Ria is an alkyl, aryl or aralkyl moiety, preferably a substituted or unsubstituted phenyl moiety, preferably a p-tolyl moiety;
T is a divalent hydrocarbyl moiety;
D is a substituted element of Group 15 or Group 16 of the periodic system, preferably an $N(R_{14})_2$ or $OR_{14}$ moiety, in which $R_{14}$ is selected to be an alkyl moiety, an aryl moiety, or an aralkyl moiety, preferably $R_{14}$ is a methyl moiety;
Y is an element selected from Group 15 of the periodic system, preferably N;
Mt is a transition metal, preferably selected from Group 3 or 4 of the periodic system, more preferably selected from Ti, Hf and Zr;
X is a sigma-bonded ligand, preferably selected from a halogen, an alkyl moiety, an aralkyl moiety, an alkoxy moiety, an aryloxy moiety, and a dialkylamine moiety; and
n is the amount of X ligands bonded to X, preferably n is 1, 2 or 3.

These compounds allow for use in catalysts that result in high molecular weight polymers, display high catalyst activities and give excellent comonomer incorporation.

DETAILED DESCRIPTION

In preferable embodiments, each of $R_1$ and $R_{12}$ are individually selected to be a moiety selected from t-butyl, adamantyl, 9H-carbazole-9-yl, hydrogen, and phenyl. For example, $R_1$ and $R_{12}$ may be the same, or $R_1$ and $R_{12}$ may be different.

It is preferred that each of $R_3$ and $R_{10}$ are individually selected to be a moiety selected from hydrogen, t-butyl and methyl, preferably wherein $R_3$ and $R_{10}$ are the same or wherein $R_3$ and $R_{10}$ are different. Furthermore, it is preferred that each of $R_2$, $R_4$, $R_5$, $R_6$, $R_7$, $R_8$, $R_9$ and $R_{11}$ are hydrogen.

In certain preferable embodiments, T is selected from an ethyl moiety (—$CH_2$—$CH_2$—) and an n-propyl moiety (—$CH_2$—$CH_2$—$CH_2$—); particularly preferably, T is an n-propyl moiety. Further, it is preferred that Y is nitrogen.

In certain embodiments of the invention, D may be part of a cyclic structure like pyridyl, tetrahydrofuran, or furane.

In a particular embodiment of the invention:
D is $O(CH_3)$ or $N(CH_3)_2$;
T is ethyl or n-propyl;
Y is N;
$A_1$ is 0 or N(p-tolyl), preferably 0; and
$A_2$ is 0 or N(p-tolyl).

The invention in a certain embodiment also relates to a catalyst system comprising a compound according to formula 1. In a preferred embodiment, such catalyst system further comprises an activator, wherein the activator is selected from an aluminoxane compound and a boron-based compound, optionally in the presence of an aluminium alkyl compound. Such aluminoxane compound may for example be selected from a methyl aluminoxane, an isobutyl aluminoxane, and a methyl-isobutyl aluminoxanes; the boron-based compound my for example be selected from a tris(pentafluorophenyl)borane an a tetrakis(pentafluorophenyl)borate. Suitable examples of such are ammonium salts or trityl compounds of tetrakis(pentafluorophenyl)borate.

For example, the catalyst system may comprise a compound according to formula 1 carried on a support material, wherein the support material may be selected from a polymeric support material, a clay material, a solid aluminoxane, or an inorganic oxide, preferably wherein the support material comprises silica, alumina or a solid aluminoxanes, such as a solid methyl aluminoxane (MAO). Suitable support materials may also include fluorided silica-alumina supports, or sulphated alumina supports. The use of such catalyst system in a supported form may be advantageous for use in certain polymerisation processes, such as in gas-phase homo- or co-polymerisation processes for the production of polymers based on ethylene and propylene. Alternatively, such catalyst system may comprise a compound according to formula 1 in unsupported form.

In a preferred embodiment, the support is a silica having a surface area of between 200 and 900 $m^2/g$ and/or a pore volume of >0.5 and <4.0 ml/g.

The invention in a further embodiment also relates to a process for the polymerisation of olefins, preferably wherein the polymerisation involves reaction of a reaction mixture comprising ethylene and/or propylene, in the presence of a catalyst system according to the invention. Such process may for example be a homopolymerisation process of ethylene, a homopolymerisation process of propylene, a copolymerisation process of ethylene with a comonomer, preferably selected from 1-butene, 1-hexene, 4-methyl-1-pentene, vinyl cyclohexane, and 1-octene, or a copolymerisation process of propylene with a comonomer, preferably selected from ethylene, 1-butene, 1-hexene, 4-methyl-1-pentene, vinyl cyclohexane, and 1-octene. For example, the process may for example be a gas-phase process, a solution process, or a slurry process.

In such polymerisation process, it is preferred that a main group organometallic compound is present that can act as a scavenger compound to scrub impurities from the polymerisation system that might otherwise adversely affect the catalyst activity. When X in formula 1 is a halogen, an alkoxide moiety, or an amine moiety, an additional function of this main group organometallic compound is to substitute X with an organic group, for example to substitute X with an alkyl or aralkyl moiety such as a methyl, ethyl, propyl, isopropyl, butyl, isobutyl, or benzyl moiety. This function of the main group organometallic compound is particularly advantageous when an activator other than an aluminoxane is used. Such main group organometallic compounds are those that are able to exchange at least one of its organic moieties with X in the compounds of the invention.

For example, organolithium compounds, organomagnesium compounds, organoaluminium compounds, organozinc compounds, or mixtures thereof, may be used as such main group organometallic compound. Preferably, the main group organometallic compound is an organoaluminium compound. Suitable organoaluminium compounds are for example trimethylaluminium, triethylaluminium, triisopropylaluminium, tri-n-propylaluminium, triisobutylaluminium, tri-n-butylaluminium, tri-tert-butylaluminium, tri-amylaluminium, tri-n-hexylaluminium, trioctylaluminium, isoprenylaluminium, dimethylaluminium ethoxide, diethylaluminium ethoxide, diisopropylaluminium ethoxide, di-n-propylaluminium ethyoxide, diisobutylaluminium ethoxide, di-n-butylaluminium ethoxide, dimethylaluminium hydride, diethylaluminium hydride, diisopropylaluminium hydride, di-n-propylaluminium hydride, diisobutylaluminium hydride, and di-n-butylaluminium hydride. Mixtures of these organoaluminium compounds are also suitable. Alternatively, aluminoxanes may be used as such main group organometallic compound. Examples of suitable aluminoxanes are methylaluminoxanes, methyl-isobutylaluminoxanes, isobutylaluminoxanes, and mixtures thereof.

In certain embodiments, it may be suitable to combine the main group organometallic compound with a compound containing at least one active hydrogen. Such combination may be done in-situ or ex-situ. In the present context, an active hydrogen means that the hydrogen atom is able to react with the main group organometallic compound. Suitable compounds comprising at least one active hydrogen in the context of the present invention are for example alcohol compounds, silanol compounds, and amine compounds. Suitable amine compounds are sterically encumbered amine compounds. Examples of sterically encumbered amine compounds are cyclohexylamine or an alkylamine comprising at least one aliphatic group having at least four carbon atoms. Suitable alcohol compounds are preferably sterically encumbered alcohol compounds, such as substituted phenolic compounds. In principle, any substituted mono- or polyphenolic compound may be used. Suitable substituted monophenolic compounds are for example butylated hydroxytoluene (BHT, 2,6-di-t-butyl-4-methylphenol), 2,6-di-t-butylphenol, and α-tocopherol (vitamin E). Preferably, the amount of the compound comprising at least one active hydrogen is such that after combining this compound with the main group organometallic compound, the latter still contains organometallic bonds, preferably at least one organometallic bond per main group metal atom.

The process to produce the olefin polymers may start with the reaction of a compound of the invention and an activator, optionally in the presence of the main group organometallic compound, optionally in the presence of a compound comprising at least one active hydrogen atom, optionally in the presence of a suitable support material. This reaction may be performed in the same vessel as the reaction vessel wherein the olefin polymers are produced, or may be a separate vessel. It may be advantageous to combine the inventive compound at first with a portion of the quantity of the main group organometallic compound that is to be used, optionally in the presence of the compound containing at least one active hydrogen, before mixing with the activator. The resulting mixture may be fed to a polymerisation reactor. During the reactions as described here above, an inert solvent may be used.

The activator may be an aluminoxane-based activator. When a mixture of the inventive compound and such aluminoxanes-based activator is used, the activator may preferably be used in a quantity of between 10 and 100,000 moles of aluminium, preferably of between 10 and 10,000 moles of aluminium, per mole of the transition metal in the inventive compound. When aluminoxanes are used as activators, especially methyl-aluminoxanes, it is know that such aluminoxanes may contain residual tri-methylaluminium, sometimes also referred to as free tri-methylaluminium. The amount of free tri-methylaluminium is typically specified by the supplier of the aluminoxanes, but it may also be determined by known analytical techniques. It may be suitable to treat such solutions of aluminoxanes with a compound containing at least one active hydrogen, like for example BHT. A suitable amount of the compound containing at least one active hydrogen in this case may be expressed as the molar ratio with respect to tri-methylaluminium, for example a molar ratio of active hydrogen to tri-methylaluminium in the range of 3:1 to 0.1:1, or in the range of 2:1 to 1:1.

Alternatively, the activator may be an organoboron-based activator. When a mixture of the inventive compound and such organoboron-based activator is used, the activator may preferably be used in a quantity of between 0.1 and 100 moles of boron, preferably of between 0.5 and 50 moles of boron, per mole of the transition metal in the inventive compound.

The compound may also be used in catalyst systems that contain a multitude of different transition-metal compounds, for example in a mixed catalyst system. Such a mixed catalyst system that contains a multitude of different transition-metal compounds may for example be used to produce polyolefins with a specific heterogeneity. This heterogeneity may be intra- or inter-molecular in nature. For example, a mixture of different transition-metal compounds may be used to produce a mixture of polymers that differ in averaged molecular weight and/or comonomer content. For example, a mixture of different transition-metal compounds may be used to produce a polymer that has an intra-molecular heterogeneity in comonomer content, for example a block-copolymer. For example, such a mixed catalyst system may be used in a single reactor or in staged reactors. For example, when using staged reactors, it may also be that one or more of the inventive compounds is used in just one reactor and the other component of the mixed catalyst system is added to a different reactor of the staged reactors. A mixed catalyst system may for example contain one or more conventional Ziegler-Natta catalysts, Phillips type chromium catalysts, metallocenes, post-metallocenes or any other transition-metal compound that catalyses the polymerization of olefins under the applied reaction conditions.

When the polymerisation is performed in a slurry or a solution process, the solvent that is used may be any organic solvent as is typically used in olefin polymerisation processes. For example, the solvent may be benzene, toluene, xylene, propane, butane, pentane, hexane, heptane, cyclohexane, methylcyclohexane, and methylchloride. Alternatively, the olefin that is to be polymerised may be used as solvent.

In the process to produce olefin polymers, the polymerisation conditions such as temperature, time, pressure, and monomer concentration may be chosen within wide limits. The polymerisation temperature may for example be in the range of between −100° C. and 300° C., preferably between 0° C. and 240° C., more preferably between 50° C. and 220° C. The polymerisation time may for example be in the range from 10 seconds to 20 hours, preferably from 1 minute to 10 hours, more preferably from 3 minutes to 5 hours. In the polymerisation of ethylene, the ethylene pressure may for example be in the range of from 1 to 3500 bar, preferably from 1 to 2500 bar, more preferably from 1 to 1000 bar, even more preferably from 1 to 500 bar, yet even more preferably from 1 to 100 bar.

The molecular weight of the polymer may be controlled by well-known means such as the use of hydrogen or zinc-alkyls in the polymerisation. The polymerisation may be conducted in a batch process, a semi-continuous process, or a continuous process. The polymerisation may be conducted in two or more steps of different polymerisation conditions. The polymer that is produced may be separated from the solvent that is employed in the polymerisation reaction and from residual monomers and optionally comonomers, and dried by methods known to the person skilled in the art.

In a process for the production of olefin polymers using the compounds of the present invention, the polymerisation may involve a homopolymerisation of an olefin monomer, or a copolymerisation of an olefin monomer and one or more comonomer(s). The olefin monomer may for example be ethylene or propylene. The comonomer may for example be ethylene, propylene, 1-butene, 1-pentene, 3-methyl-1-butene, 3,3-dimethyl-1-butene, 4-methyl-1-pentene, 3-methyl-1-pentene, 1-hexene, 1-octene, 1-nonene, 1-decene; a conjugated or a non-conjugated diene such as butadiene, 1,4-hexadiene, a substituted or unsubstituted norbornene, 5-ethylidene-2-norbornene, vinyl-norbornene, dicyclopentadiene, 4-methyl-1,4-hexadiene, 1,9-decadiene, or 7-methyl-1,6-octadiene; cyclic olefins such as cyclobutene, cyclopentene; or other olefinic compounds such as isobutene, vinyl-cyclohexane, or styrene.

Preferably, the olefin monomer is ethylene. The polymer produced using ethylene as olefin monomer may be referred to as an ethylene homopolymer, or, in case that the polymerisation is a copolymerisation reaction, an ethylene copolymer. Such ethylene homopolymers and copolymers may together be referred to as polyethylenes. In the case that for example three monomers are used, one can also produce terpolymers, for example if a combination of ethylene, propylene and a third comonomer containing at least two olefinic bonds, such as norbornadiene, dicylopentadiene, ethylidene-norbornene or vinyl-norbornene, are used, one can make terpolymers that can be referred to as EPDM. Preferably, the comonomer is an olefin having 3 or more carbon atoms, for example an olefin comprising 3 to 10 carbon atoms, such as an α-olefin comprising 3 to 10 carbon atoms.

Preferably, the comonomer is selected from propene, 1-butene, 1-hexene, 1-octene, norbornene, vinyl-cyclohexane, styrene, and 4-methyl-1-pentene. Preferably, the olefin monomer is ethylene, and the comonomer is selected from 1-butene, 1-hexene, 1-octene, norbornene, vinyl-cyclohexane, styrene, and 4-methyl-1-pentene.

Preferably, the process for the production of olefin polymers using the compounds of the present invention is copolymerisation of an olefin monomer and one or more comonomer(s), wherein the olefin monomer is ethylene, and the comonomer is selected from 1-butene, 1-hexene, 1-octene, norbornene, vinyl-cyclohexane, styrene, and 4-methyl-1-pentene. Particularly preferable, the process for the production of olefin polymers using the compounds of the present invention is copolymerisation of an olefin monomer and one or more comonomer(s), wherein the olefin monomer is ethylene, and the comonomer is selected from 1-butene, 1-hexene, 4-methyl-pentene-1, vinylcyclohexane, and 1-octene.

In case that the polymerisation is a copolymerisation of an olefin and one or more comonomer(s), the olefin and the comonomer(s) are different compounds.

The olefin polymer may for example comprise from 1.0 to 80.0 wt. % of moieties derived from the comonomer, preferably from 5.0 to 60.0 wt %, more preferably from 10.0 to 50.0 wt %, or from 10.0 to 30.0 wt %, with regard to the total weight of the olefin polymer. The ethylene copolymer may for example comprise from 1.0 to 80.0 wt. % of moieties derived from the comonomer, preferably from 5.0 to 60.0 wt %, more preferably from 10.0 to 50.0 wt %, or from 10.0 to 30.0 wt %, with regard to the total weight of the ethylene copolymer.

The polyethylene may for example have a melt mass-flow rate as determined in accordance with ASTM D1238-10 at 190° C. at a load of 2.16 kg (MFI2.16) of ≥0.1 and ≤125 g/10 min. For example, the polyethylene may have an MFI2.16 of ≥0.1 and ≤50 g/10 min, or ≥0.3 and ≤10.0 g/10 min, or ≥0.5 and ≤5.0 g/10 min.

The olefin polymer may for example be of very high molecular weight, for example an ultra high molecular weight polyolefin, for example Ultra High Molecular weight Polyethylene, UHMwPE.

The polyethylene may for example have a density of ≥855 kg/m3 and ≤970 kg/m3, as determined in accordance with ASTM D1505-10. The polyethylene may for example have a density of ≥855 and ≤910 kg/m3, or of ≥875 and ≤900 kg/m3. The polyethylene may for example have a density of ≥910 and ≤925 kg/m3, or of ≥910 and ≤920 kg/m3, or of ≥915 and ≤920 kg/m3. The polyethylene may for example have a density of ≥925 and ≤940 kg/m3, or of ≥930 and ≤940 kg/m3. The polyethylene may for example have a density of ≥940 and ≤965 kg/m3, or of ≥945 and ≤960 kg/m3.

It has been found that using the compounds of the present invention, it is possible to produce ethylene copolymers wherein the comonomer is selected from 1-butene, 1-hexene, 4-methyl-1-pentene, vinyl-cyclohexane and 1-octene with particularly high incorporation of the comonomer. The amount of incorporation of the comonomer may be expressed as the amount of short chain branches per 1000 carbon atoms in the polymer. The amount of short chain branches may for example be determined using 13C NMR via the method as described by Randall, Rev. Macromol. Chem. Phys., C. 29, V. 2&3, p. 285-297. The ethylene copolymer may for example comprise at least 10, 25, or 80 short chain branches per 1000 carbon atoms in the polymer. The ethylene copolymer may comprise at most 200, 100, 50 or 25 short chain branches per 1000 carbon atoms in the polymer. The ethylene copolymer may for example comprise at least 10 and at most 200 short chain branches per 1000 carbon atoms in the polymer, or at least 15 and at most 100, or at least 20 and at most 50.

The polyethylene may have a number-average molecular weight (Mn) of between 1,000 and 10,000,000 g/mol, preferably between 10,000 and 1,000,000 g/mol, more preferably between 20,000 and 500,000 g/mol. The polyethylene may have a weight-average molecular weight (Mw) of between 2,000 and 20,000,000 g/mol, preferably between 20,000 and 2,000,000 g/mol, more preferably between 40,000 and 1,000,000 g/mol. The Mw and Mn are determined in accordance with ASTM D6474-12, using 1,2,4-trichlorobenzene or o-dichlorobenzene as solvent, and calibrated using polyethylene or polystyrene standards. The polyethylene may for example have a molecular weight distribution Mw/Mn of ≥2.0 and ≤5.0, or ≥2.1 and ≤4.0, or a 2.5 and ≤3.5.

The invention will now be illustrated by the following non-limiting examples.

Via the synthesis methods as described further below, the following inventive compounds were prepared:

I-1
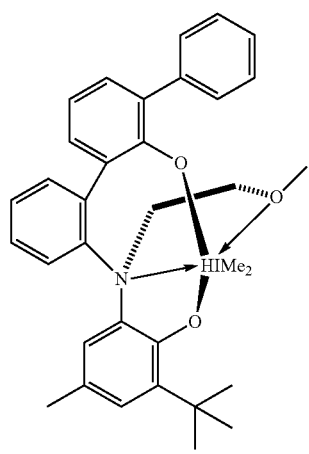

I-2
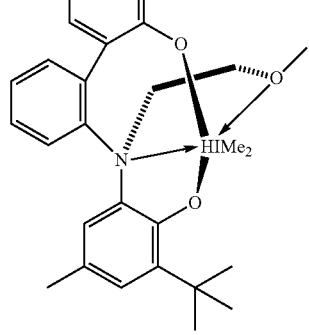

I-3
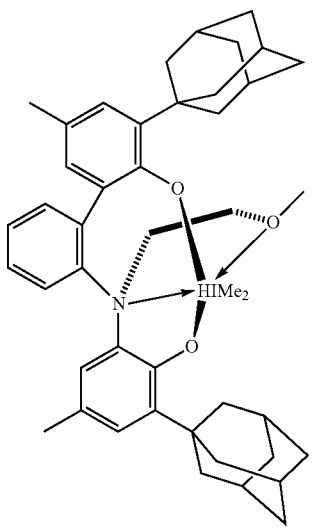

I-4
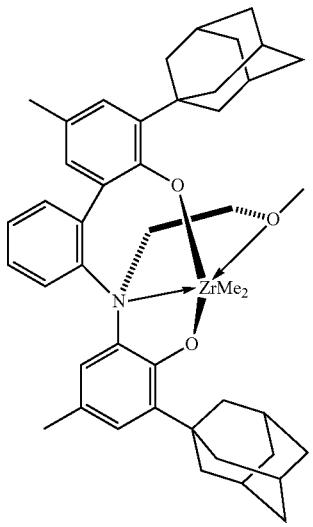

I-5
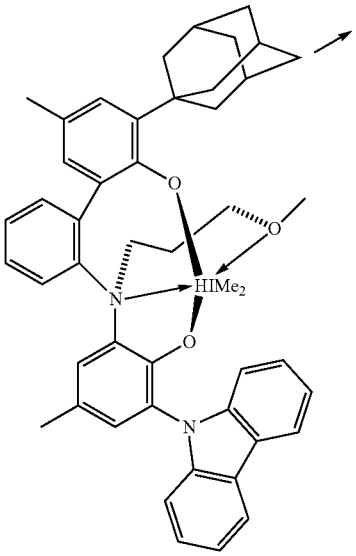

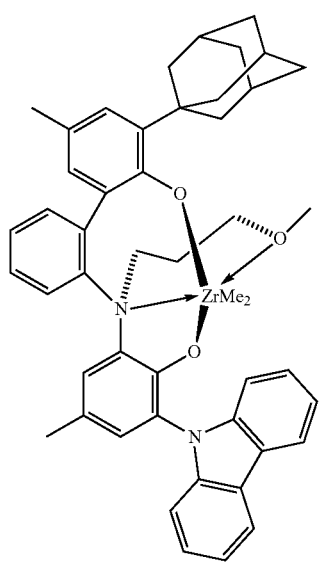
I-6
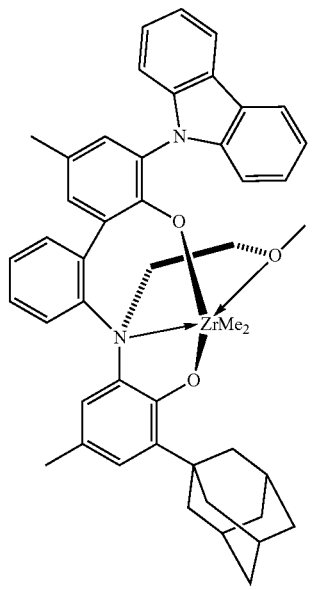
I-8
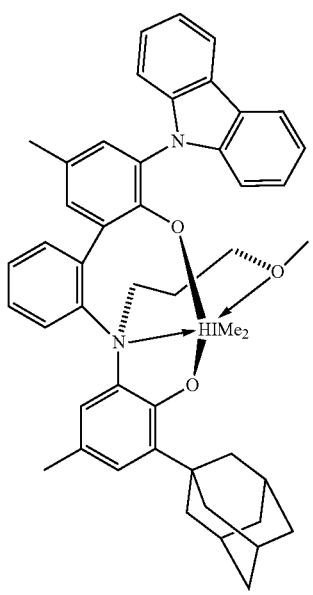
I-9

I-10
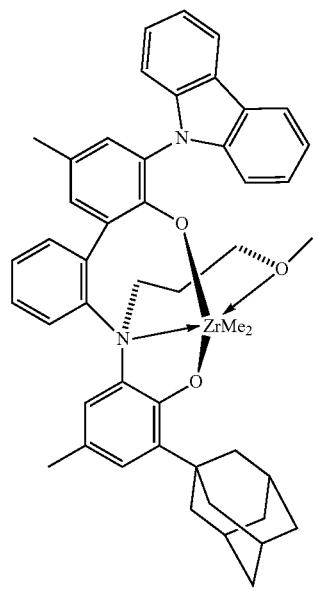
I-11
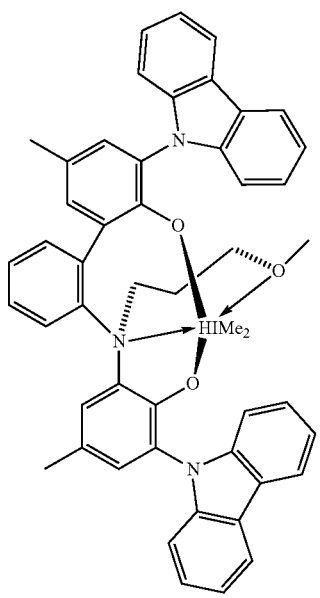
I-12
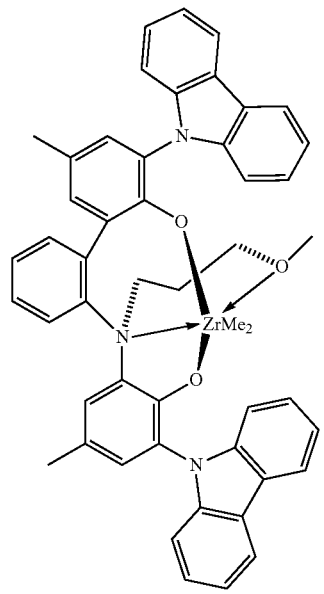
I-13
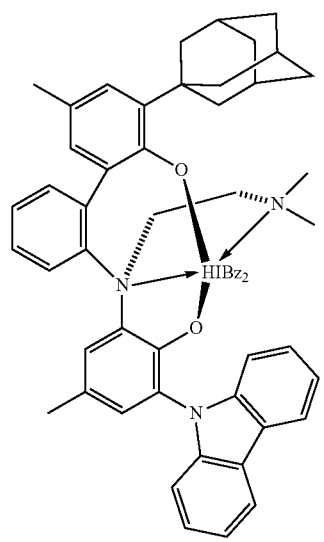
I-14
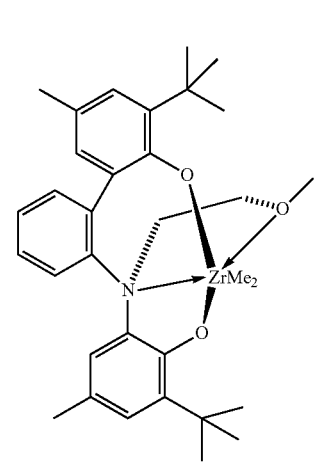

-continued
I-15
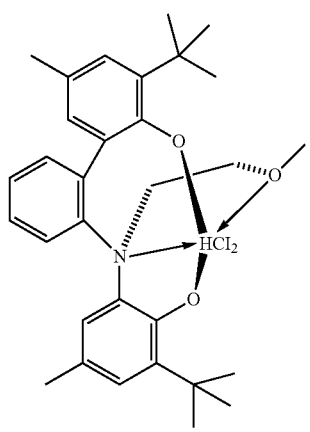
I-16
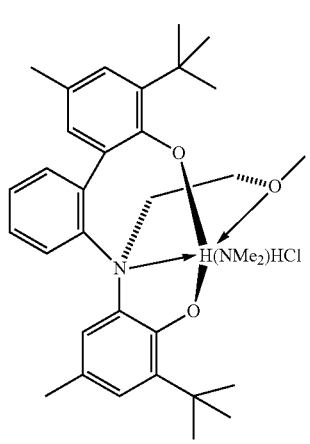
I-17
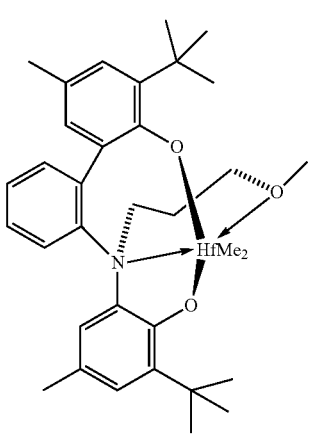
-continued
I-18
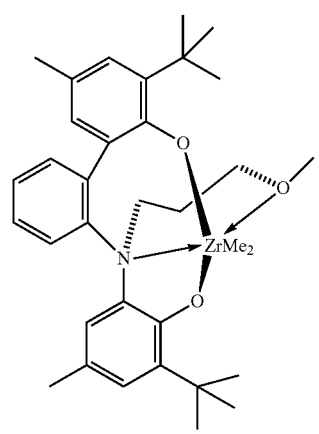
I-19
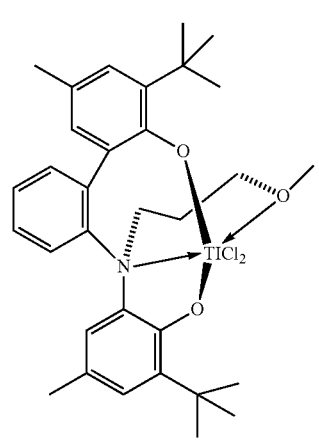
I-20
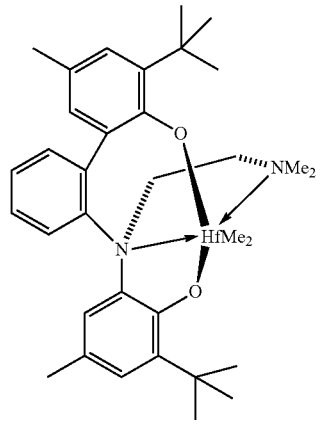

I-21
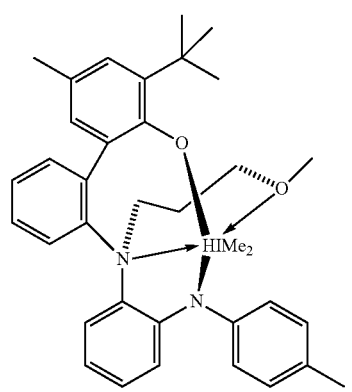
I-22
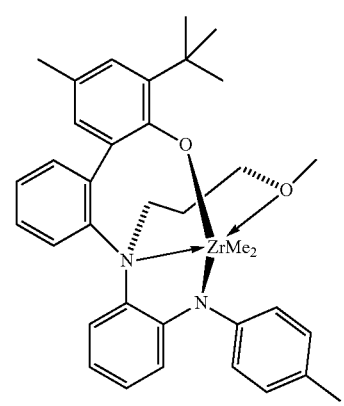
I-23
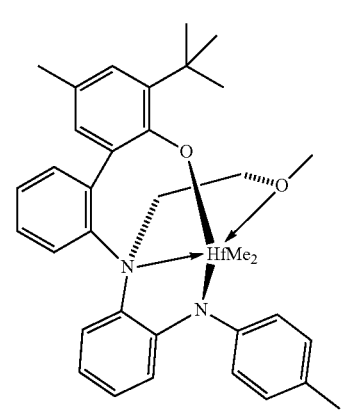
I-24
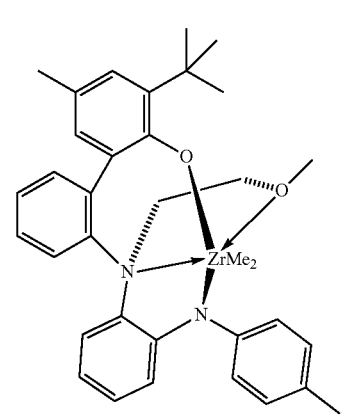
C-1
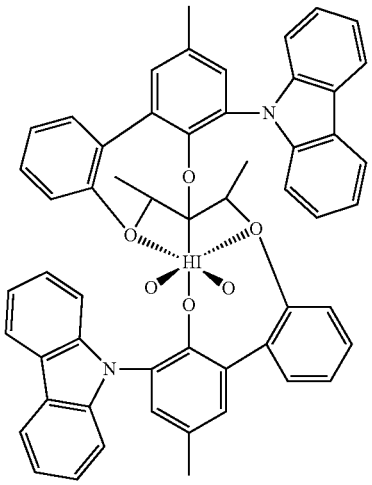
C-2
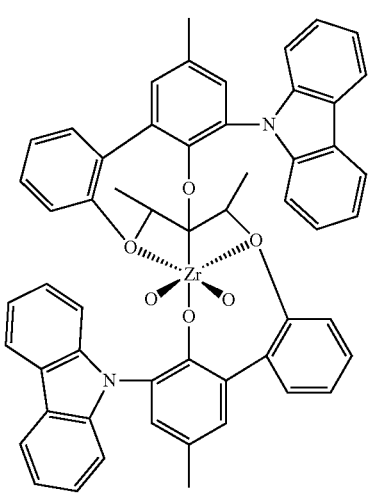
C-3
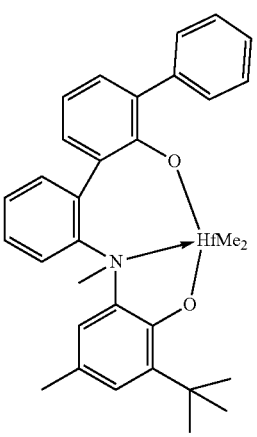

-continued

C-4
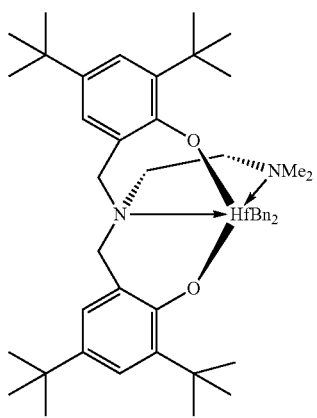

C-5
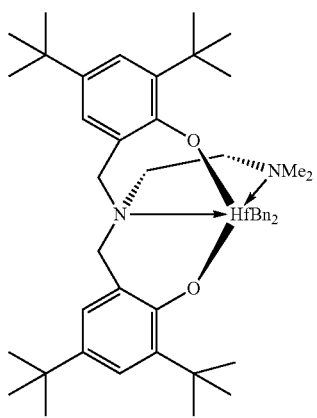

C-6
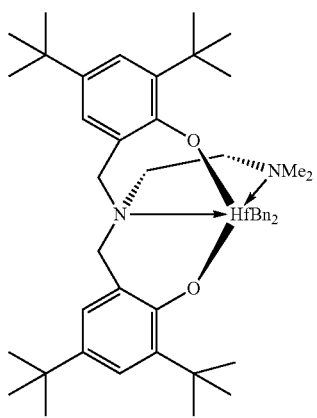

Synthesis Routes
General Procedures of Synthesis

Synthesis of inventive post-metallocene compounds was carried out in nitrogen atmosphere in a glove-box setup, the atmosphere comprising <1 ppm of $O_2$ and <1 ppm of $H_2O$.

General Procedure 1. Borylation of MOM-Protected Phenols

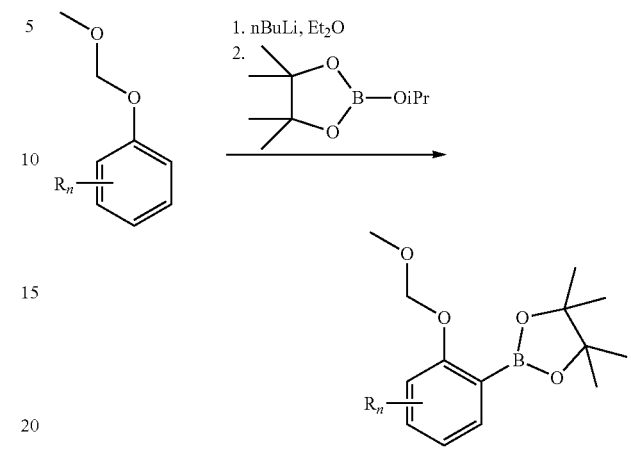

A substituted MOM-protected phenol was dissolved in dry ether and BuLi (2.5 M in hexanes) was added dropwise to the solution at 0° C. After that, the cooling bath was removed and the resulting mixture was stirred at r.t. overnight. 2-Isopropoxy-4,4,5,5-tetramethyl-1,3,2-dioxaborolane was added dropwise to the mixture at 0° C. and the resulting suspension was stirred at r.t. overnight. The mixture was diluted with water and the organic layer was separated. The aqueous layer was extracted with ether; the combined extracts were washed with brine, dried over $Na_2SO_4$, and evaporated to dryness. The residue was purified by flash chromatography on silica gel 60 using hexane-dichloromethane mixture as eluent.

General Procedure 2. Suzuki-Miyaura Cross-coupling

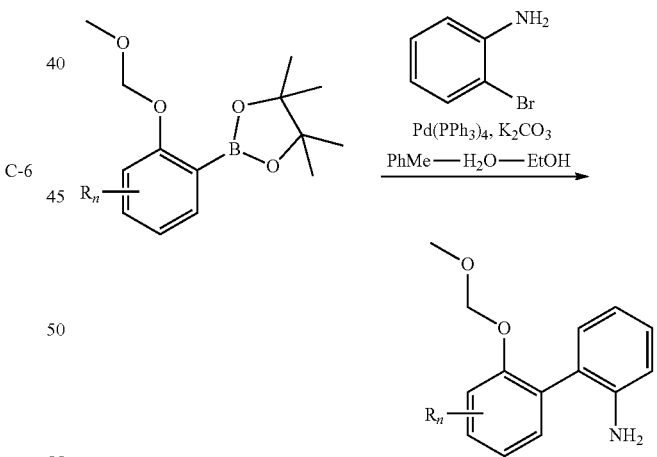

A solution of a substituted MOM-protected 2-(4,4,5,5-tetramethyl-1,3,2-dioxaborolan-2-yl)phenol (1 eq), 2-bromoaniline (1 eq), $K_2CO_3$ (2.5 eq), and $Pd(Ph_3P)_4$ (0.05 eq) in PhMe/EtOH/$H_2O$ mixture (5/2/1 mL/mmol) was refluxed for 16 h under argon atmosphere. After cooling the mixture was diluted with water and the organic layer was separated. The aqueous layer was extracted with toluene; the combined extracts were washed with brine, dried over $Na_2SO_4$, and evaporated to dryness. The residue was purified by flash chromatography on silica gel 60 using hexane-ethyl acetate mixture as eluent.

General Procedure 3. Buchwald-Hartwig Arylation of Anilines

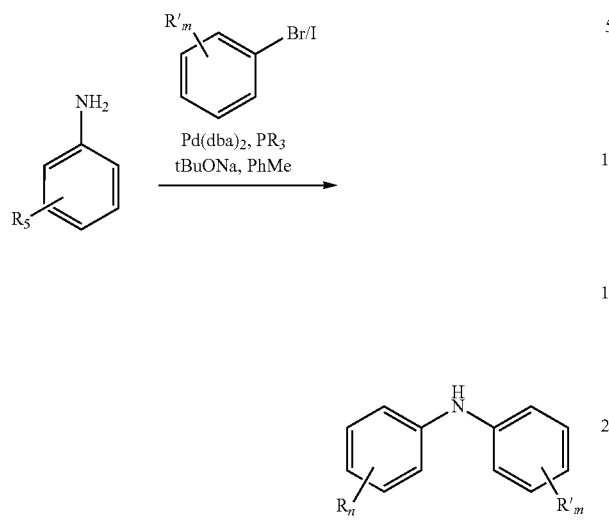

A solution of a substituted aniline (1 eq), an aryl bromide or aryl iodide (1 eq), Pd(dba)2 (0.03 eq), a phosphine ligand (0.06 eq), and tBuONa (1.5 eq) in PhMe (10 mL per mmol of the aniline) was stirred at 110° C. overnight. After cooling, the mixture was washed with water, dried over Na$_2$SO$_4$, and evaporated to dryness. The residue was purified by flash chromatography on silica gel 60 using hexane-ethyl acetate mixture as eluent.

General Procedure 4. Alkylation of Diarylamines

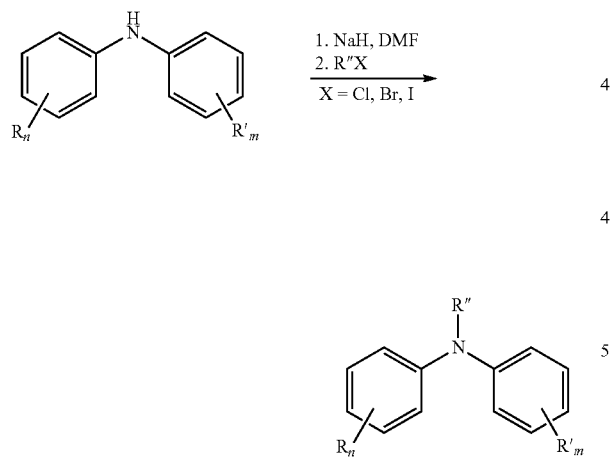

A diarylamine (1 eq) was added to a suspension of NaH (3 eq, 60% dispersion in mineral oil) in dry DMF (5-10 mL per mmol of the diarylamine) and the resulting mixture was stirred at r.t. for several hours. Then an alkylating agent (5 eq) was added in one portion and the resulting mixture was stirred overnight Brine (brine/DMF=10 v/v) was added and an organic product was extracted five times with ether. The combined extracts were washed with brine, dried over Na$_2$SO$_4$, and evaporated to dryness. The residue was purified by flash chromatography on silica gel 60 using hexane-ethyl acetate mixture as eluent.

General Procedure 5. Deprotection of MOM-Protected Phenols

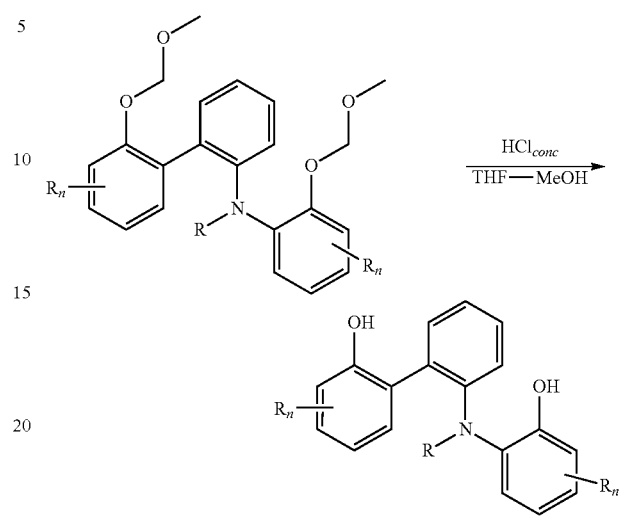

A solution of a MOM-protected phenol (1 eq) and HCl$_{conc}$ (2 mL per mmol of the MOM-protected phenol) in THF (10 mL per mmol of the MOM-protected phenol) and MeOH (10 mL per mmol of the MOM-protected phenol) was stirred at 60° C. overnight. After cooling to r.t., water was added and organic solvents were removed under reduced pressure. A product was extracted two times with ether, the combined extracts were washed with brine, dried over Na$_2$SO$_4$, and evaporated to dryness. The residue was purified by flash chromatography on silica gel 60 using hexane-ethyl acetate mixture as eluent.

General Procedure 6. Reduction of N,N-Dialkylamides with Lithium Aluminum Hydride (LAH)

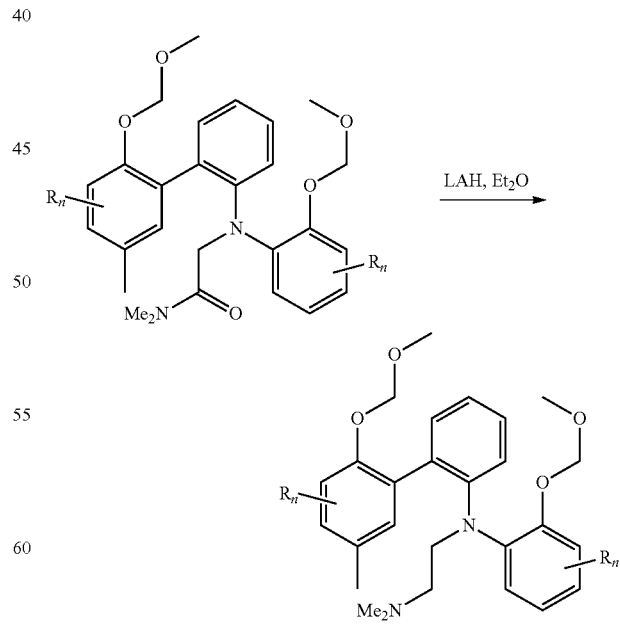

To a suspension of LAH (3 eq) in ether (7 mL per mmol of LAH) an amide (1 eq) was added in one portion and the resulting mixture was stirred overnight at r.t. Water was added dropwise at 0° C. until white suspension was formed, then it was filtered through a short pad of Celite. The organic layer was separated, dried over $Na_2SO_4$ and evaporated to dryness. The residue was purified by flash chromatography on silica gel 60 using hexane-ethyl acetate mixture as eluent.

General Procedure 7. Synthesis of Zirconium and Hafnium Post-Metallocenes

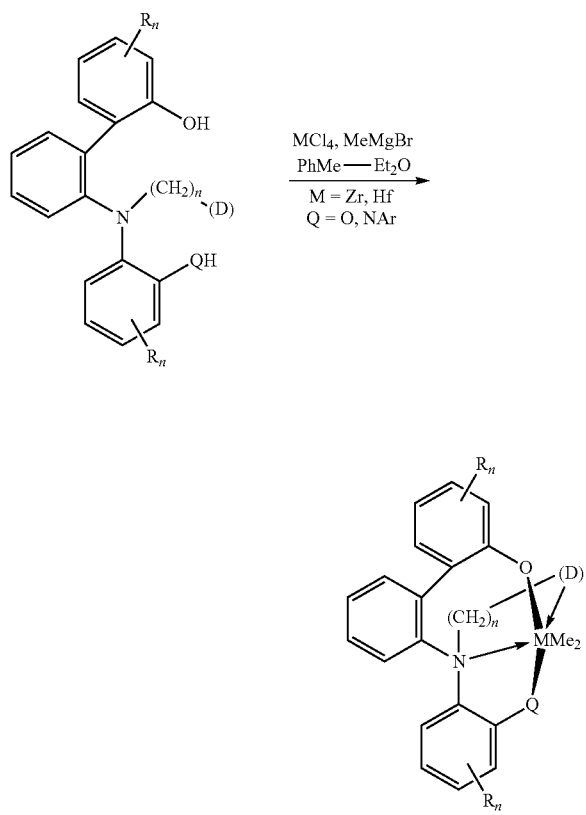

To a suspension of $HfCl_4$ or $ZrCl_4$ (1.02 eq) in dry PhMe (20 mL per mmol of pro-ligand) a solution of MeMgBr in ether (4.5 eq, 2.9 M) was added at r.t. (for $HfCl_4$) or at −30° C. (for $ZrCl_4$). Then, a ligand (1 eq) was added to the solution at the same temperature and the resulting mixture was stirred at r.t. overnight. The dark suspension formed was evaporated to dryness, the solid residue was extracted with either PhMe or MCH several times. The combined extracts were filtered through a short pad of Celite, and then evaporated to dryness. Final purification of the resulting solid was achieved by washing with/recrystallization from either hexane or MCH followed by drying at 100° C. under reduced pressure for 1 h.

General Procedure 8. Synthesis of Titanium Post Metallocenes

To a solution of a ligand (1 eq) in dry PhMe (20 mL/mmol) $TiCl_4(THF)_2$ (1 eq) was added in one portion and the resulting dark-red solution was stirred at r.t. overnight. After evaporation of all volatiles, a crude complex was washed with pentane and then dried at 100° C. under reduced pressure for 1 h.

Method A: Specific Synthesis of Hf-Complex I-15 (282)

To a solution of 2'-((3-(9H-carbazol-9-yl)-2-hydroxy-5-methylphenyl)(2-(dimethylamino)ethyl)amino)-3-(adamantan-1-yl)-5-methyl-[1,1'-biphenyl]-2-ol (0.26 g, 0.38 mmol, 1 eq) in dry PhMe (8 mL) $HfBn_4$ (0.21 g, 0.38 mmol, 1 eq) was added in one portion and the resulting solution was stirred at r.t. overnight. After evaporation of all volatiles, the Hf-complex of I-15 was obtained as viscous oil in nearly quantitative yield.

Method B: Specific Synthesis of Ti-complex I-19 (296)

To a solution of 3-(tert-butyl)-2'-((3-(tert-butyl)-2-hydroxy-5-methylphenyl)(2-methoxyethyl)amino)-5-methyl-[1,1'-biphenyl]-2-ol (0.50 g, 1.00 mmol, eq) in PhMe (21 ml) $Ti(NMe_2)_4$ (0.24 g, 1.00 mmol, 1 eq) was added in one portion and the resulting mixture was stirred overnight at r.t. The resulting dark-red mixture was evaporated to dryness to afford titanium diamide complex in near quantitative yield.

To obtain the inventive compounds as listed above, syntheses were performed using the above-mentioned general procedures according to the table below:

| ID | Ligand | LS | Pro-catalyst | PS |
|---|---|---|---|---|
| I-1 | 2-((3-(tert-butyl)-2-hydroxy-5-methylphenyl)(2-methoxyethyl)amino)-[1,1': 3',1''-terphenyl]-2'-ol | 4, 5 | [2-((3-(tert-butyl)-2-olato-5-methylphenyl)(2-methoxyethyl)amino)-[1,1': 3',1''-terphenyl]-2'-olato] dimethyl hafnium | 7 |
| I-2 | 2-((3-(tert-butyl)-2-hydroxy-5-methylphenyl)(2-methoxyethyl)amino)-[1,1': 3', 1''-terphenyl]-2'-ol | 4, 5 | [2-((3-(tert-butyl)-2-olato-5-methylphenyl)(2-methoxyethyl)amino)-[1,1': 3',1''-terphenyl]-2'-olato] dimethyl zirconium | 7 |
| I-3 | 3-(adamantan-1-yl)-2'-((3-(adamantan-1-yl)-2-hydroxy-5- | 1, 2, 3, 4, 5 | [3-(adamantan-1-yl)-2'-((3-(adamantan-1-yl)-2-olato-5- | 7 |

-continued

| ID | Ligand | LS | Pro-catalyst | PS |
|---|---|---|---|---|
|  | methylphenyl)(2-methoxyethyl)amino)-5-methyl-[1,1'-biphenyl]-2-ol |  | methylphenyl)(2-methoxyethyl)amino)-5-methyl-[1,1'-biphenyl]-2-olato] dimethyl hafnium |  |
| I-4 | 3-(adamantan-1-yl)-2'-((3-(adamantan-1-yl)-2-hydroxy-5-methylphenyl)(2-methoxyethyl)amino)-5-methyl-[1,1'-biphenyl]-2-ol | 1, 2, 3, 4, 5 | [3-(adamantan-1-yl)-2'-((3-(adamantan-1-yl)-olato-5-methylphenyl)(2-methoxyethyl)amino)-5-methyl-[1,1'-biphenyl]-2-olato] dimethyl zirconium | 7 |
| I-5 | 2'-((3-(9H-carbazol-9-yl)-2-hydroxy-5-methylphenyl)(3-methoxypropyl)amino)-3-(adamantan-1-yl)-5-methyl-[1,1'-biphenyl]-2-ol | 3, 4, 5 | [2'-((3-(9H-carbazol-9-yl)-2-olato-5-methylphenyl)(3-methoxypropyl)amino)-3-(adamantan-1-yl)-5-methyl-[1,1'-biphenyl]-2-olato] dimethyl hafnium | 7 |
| I-6 | 2'-((3-(9H-carbazol-9-yl)-2-hydroxy-5-methylphenyl)(3-methoxypropyl)amino)-3-(adamantan-1-yl)-5-methyl-[1,1'-biphenyl]-2-ol | 3, 4, 5 | [2'-((3-(9H-carbazol-9-yl)-2-olato-5-methylphenyl)(3-methoxypropyl)amino)-3-(adamantan-1-yl)-5-methyl-[1,1'-biphenyl]-2-olato] dimethyl zirconium | 7 |
| I-7 | 2'-((3-(adamantan-1-yl)-2-hydroxy-5-methylphenyl)(2-methoxyethyl)amino)-3-(9H-carbazol-9-yl)-5-methyl-[1,1'-biphenyl]-2-ol | 1, 2, 3, 4, 5 | [2'-((3-(adamantan-1-yl)-2-olato-5-methylphenyl)(2-methoxyethyl)amino)-3-(9H-carbazol-9-yl)-5-methyl-[1,1'-biphenyl]-2-olato] dimethyl hafnium | 7 |
| I-8 | 2'-((3-(adamantan-1-yl)-2-hydroxy-5-methylphenyl)(2-methoxyethyl)amino)-3-(9H-carbazol-9-yl)-5-methyl-[1,1'-biphenyl]-2-ol | 1, 2, 3, 4, 5 | [2'-((3-(adamantan-1-yl)-2-olato-5-methylphenyl)(2-methoxyethyl)amino)-3-(9H-carbazol-9-yl)-5-methyl-[1,1'-biphenyl]-2-olato] dimethyl zirconium | 7 |
| I-9 | 2'-((3-(adamantan-1-yl)-2-hydroxy-5-methylphenyl)(3-methoxypropyl)amino)-3-(9H-carbazol-9-yl)-5-methyl-[1,1'-biphenyl]-2-ol | 4, 5 | [2'-((3-(adamantan-1-yl)-2-olato-5-methylphenyl)(3-methoxypropyl)amino)-3-(9H-carbazol-9-yl)-5-methyl-[1,1'-biphenyl]-2-olato] dimethyl hafnium | 7 |
| I-10 | 2'-((3-(adamantan-1-yl)-2-hydroxy-5-methylphenyl)(3-methoxypropyl)amino)-3-(9H-carbazol-9-yl)-5-methyl-[1,1'-biphenyl]-2-ol | 4, 5 | [2'-((3-(adamantan-1-yl)-2-olato-5-methylphenyl)(3-methoxypropyl)amino)-3-(9H-carbazol-9-yl)-5-methyl-[1,1'-biphenyl]-2-olato] dimethyl zirconium | 7 |
| I-11 | 2'-((3-(9H-carbazol-9-yl)-2-hydroxy-5-methylphenyl)(3-methoxypropyl)amino)-3-(9H-carbazol-9-yl)-5-methyl-[1,1'-biphenyl]-2-ol | 4, 5 | [2'-((3-(9H-carbazol-9-yl)-2-olato-5-methylphenyl)(3-methoxypropyl)amino)-3-(9H-carbazol-9-yl)-5-methyl-[1,1'-biphenyl]-2-olato] dimethyl hafnium | 7 |
| I-12 | 2'-((3-(9H-carbazol-9-yl)-2-hydroxy-5-methylphenyl)(3-methoxypropyl)amino)-3-(9H-carbazol-9-yl)-5-methyl-[1,1'-biphenyl]-2-ol | 4, 5 | [2'-((3-(9H-carbazol-9-yl)-2-olato-5-methylphenyl)(3-methoxypropyl)amino)-3-(9H-carbazol-9-yl)-5-methyl-[1,1'-biphenyl]-2-olato] dimethyl zirconium | 7 |
| I-13 | 2'-((3-(9H-carbazol-9-yl)-2-hydroxy-5-methylphenyl)(2-(dimethylamino)ethyl)amino)-3-(adamantan-1-yl)-5-methyl-[1,1'-biphenyl]-2-ol | 4, 6, 5 | [2'-((3-(9H-carbazol-9-yl)-2-olato-5-methylphenyl)(2-(dimethylamino)ethyl)amino)-3-(adamantan-1-yl)-5-methyl-[1,1'-biphenyl]-2-olato] dibenzyl hafnium | A |
| I-14 | 3-(tert-butyl)-2'-((3-(tert-butyl)-2-hydroxy-5-methylphenyl)(2-methoxyethyl)amino)-5-methyl-[1,1'-biphenyl]-2-ol | 1, 2, 3, 4, 5 | [3-(tert-butyl)-2'-((3-(tert-butyl)-2-olato-5-methylphenyl)(2-methoxyethyl)amino)-5-methyl-[1,1'-biphenyl]-2-olato] dimethyl zirconium | 7 |
| I-15 | 3-(tert-butyl)-2'-((3-(tert-butyl)-2-hydroxy-5-methylphenyl)(2-methoxyethyl)amino)-5-methyl-[1,1'-biphenyl]-2-ol | 1, 2, 3, 4, 5 | [3-(tert-butyl)-2'-((3-(tert-butyl)-2-olato-5-methylphenyl)(2-methoxyethyl)amino)-5-methyl-[1,1'-biphenyl]-2-olato] dichloro titanium | 8 |
| I-16 | 3-(tert-butyl)-2'-((3-(tert-butyl)-2-hydroxy-5-methylphenyl)(2-methoxyethyl)amino)-5-methyl-[1,1'-biphenyl]-2-ol | 1, 2, 3, 4, 5 | [3-(tert-butyl)-2'-((3-(tert-butyl)-2-olato-5-methylphenyl)(2-methoxyethyl)amino)-5-methyl-[1,1'-biphenyl]-2-olato] monochloro dimethylamido titanium | B |
| I-17 | 3-(tert-butyl)-2'-((3-(tert-butyl)-2-hydroxy-5-methylphenyl)(3-methoxypropyl)amino)-5-methyl-[1,1'-biphenyl]-2-ol | 4, 5 | [3-(tert-butyl)-2'-((3-(tert-butyl)-2-olato-5-methylphenyl)(3-methoxypropyl)amino)-5-methyl-[1,1'-biphenyl]-2-olato] dimethyl hafnium | 7 |
| I-18 | 3-(tert-butyl)-2'-((3-(tert-butyl)-2-hydroxy-5-methylphenyl)(3-methoxypropyl)amino)-5-methyl-[1,1'-biphenyl]-2-ol | 4, 5 | [3-(tert-butyl)-2'-((3-(tert-butyl)-2-olato-5-methylphenyl)(3-methoxypropyl)amino)-5-methyl-[1,1'-biphenyl]-2-olato] dimethyl zirconium | 7 |
| I-19 | 3-(tert-butyl)-2'-((3-(tert-butyl)-2-hydroxy-5-methylphenyl)(3- | 4, 5 | [3-(tert-butyl)-2'-((3-(tert-butyl)-2-olato-5-methylphenyl)(3- | 8 |

-continued

| ID | Ligand | LS | Pro-catalyst | PS |
|---|---|---|---|---|
| | methoxypropyl)amino)-5-methyl-[1,1'-biphenyl]-2-ol | | methoxypropyl)amino)-5-methyl-[1,1'-biphenyl]-2-olato] dichloro titanium | |
| I-20 | 3-(tert-butyl)-2'-((3-(tert-butyl)-2-hydroxy-5-methylphenyl)(2-(dimethylamino)ethyl)amino)-5-methyl-[1,1'-biphenyl]-2-ol | 4, 6, 5 | [3-(tert-butyl)-2'-((3-(tert-butyl)-2-olato-5-methylphenyl)(2-(dimethylamino)ethyl)amino)-5-methyl-[1,1'-biphenyl]-2-olato] dimethyl hafnium | 7 |
| I-21 | 3-(tert-butyl)-2'-((3-methoxypropyl)(2-(p-tolylamino)phenyl)amino)-5-methyl-[1,1'-biphenyl]-2-ol | 3, 4, 5, 3 | [3-(tert-butyl)-2'-((3-methoxypropyl)(2-(p-tolylamido)phenyl)amino)-5-methyl-[1,1'-biphenyl]-2-olato] dimethyl hafnium | 7 |
| I-22 | 3-(tert-butyl)-2'-((3-methoxypropyl)(2-(p-tolylamino)phenyl)amino)-5-methyl-[1,1'-biphenyl]-2-ol | 3, 4, 5, 3 | [3-(tert-butyl)-2'-((3-methoxypropyl)(2-(p-tolylamido)phenyl)amino)-5-methyl-[1,1'-biphenyl]-2-olato] dimethyl zirconium | 7 |
| I-23 | 3-(tert-butyl)-2'-((2-methoxyethyl)(2-(p-tolylamino)phenyl)amino)-5-methyl-[1,1'-biphenyl]-2-ol | 4, 5, 3 | [3-(tert-butyl)-2'-((2-methoxyethyl)(2-(p-tolylamido)phenyl)amino)-5-methyl-[1,1'-biphenyl]-2-olato] dimethyl hafnium | 7 |
| I-24 | 3-(tert-butyl)-2'-((2-methoxyethyl)(2-(p-tolylamino)phenyl)amino)-5-methyl-[1,1'-biphenyl]-2-ol | 4, 5, 3 | [3-(tert-butyl)-2'-((2-methoxyethyl)(2-(p-tolylamido)phenyl)amino)-5-methyl-[1,1'-biphenyl]-2-olato] dimethyl zirconium | 7 |

In the table above, the numbers in the column LS indicate the general procedures for the ligand synthesis, the number in the column PS indicates the general procedure for the precursor synthesis, i.e. the compounds of the invention.

Using the compounds obtained as per the above, polymerisation experiments were conducted to investigate the performance of the compounds as catalysts in ethylene polymerisations.

Polymerisations were carried out in a Parallel Pressure Reactor (PPR48) for olefin polymerisation, containing 48 reactors mounted in a triple glove-box, obtainable from the company Freeslate. The applied polymerisation protocols were as follows:

Prior to execution of a library, the 48 PPR cells (reactors) undergo 'bake-and-purge' cycles overnight (8 h at 90-140° C., with intermittent dry $N_2$ flow) to remove any contaminants. After cooling to glove-box temperature (23° C.), the stir tops are taken off, and the cells are fitted with disposable 10 ml glass inserts and PEEK stirring paddles, previously hot-dried under vacuum. The stir tops are then set back in place, the cells are loaded with the proper amounts of toluene (in the range of 2.0-4.0 ml), 1-hexene (in the range of 0.05-2.0 ml) and a tri-isobutyl-aluminium (TiBAl)/butylated hydroxytoluene (BHT) (1:1 molar reaction product) solution, thermostated at 80° C., and brought to the operating pressure of 1.0 MPa with ethylene, unless otherwise specified in the examples. The TiBAl/BHT amount was chosen such that [Al]=3 mM.

In case the activator was trityl tetrakis pentafluorophenyl borate (TTB), a boron to catalyst molar ratio of 10 was applied. The catalyst injection sequence is as follows: proper volumes of a toluene chaser, a solution of the precatalyst in toluene (typically in the range of 0.005-0.05 mmol/l) and a toluene buffer are uptaken into the slurry needle, and then injected into the cell of destination. The reaction is left to proceed under stirring (800 rpm) at constant temperature (80° C.) and pressure (1.0 MPa, unless otherwise specified) with continuous feed of ethylene for 5-60 minutes, and quenched by over-pressurising the cell with dry air.

After quenching, the cells are cooled down and vented, the stir-tops are removed, and the glass inserts containing the reaction phase are taken out and transferred to a Genevac EZ2-Plus centrifugal evaporator, where all volatiles are distilled out and the obtained polymers are thoroughly dried overnight. Reaction yields are double-checked against on-line monomer conversion measurements by robotically weighing the dry polymers in a Bohdan Balance Automator while still in the reaction vials, subtracting the pre-recorded tare. Polymer aliquots are then sampled out for the characterisations.

GPC curves were recorded with a Freeslate Rapid GPC setup, equipped with a set of 2 mixed-bed Agilent PLgel 10 μm columns and a Polymer Chat IR4 detector. The upper deck of the setup features a sample dissolution station for up to 48 samples in 10 ml magnetically stirred vials, 4 thermostated bays each accommodating 48 polymer solutions in 10 ml glass vials, and a dual arm robot with two heated injection needles. With robotic operation, pre-weighed polymer amounts (typically 1-4 mg) are dissolved in proper volumes of orthodichlorobenzene (ODCB) containing 0.40 mg/ml of 2,6-di-tert-butyl-4-methylphenol (BHT) as stabiliser, so as to obtain solutions at a concentration of 0.5 to 1.0 mg/ml. After 2-4 h at 150° C. under gentle stirring to ensure complete dissolution, the samples are transferred to a thermostated bay at 145° C., and sequentially injected into the system at 145° C. and a flow rate of 1.0 ml/min. In post-trigger delay operation mode, the analysis time is 12.5 min per sample. Calibration is carried out with the universal method, using 10 monodisperse polystyrene samples ($M_n$ between 1.3 and 3700 kg/mol). Before and after each campaign, samples from a known i-PP batch produced with an ansa-zirconocene catalyst are analysed for a consistency check.

$^{13}C$ NMR spectra are recorded with a Bruker Avance 400 III spectrometer equipped with a 5 mm High Temperature Cryoprobe, and a robotic sample charger with a pre-heated carousel (24 positions). The samples (20-30 mg) are dissolved at 120° C. in tetrachloroethane-1,2-d2 (0.6 ml), added with 0.40 mg/ml of BHT as stabiliser, and loaded in the carousel maintained at the same temperature. The spectra are taken sequentially with automated tuning, matching and shimming. Typical operating conditions for routine measurements are: 45° pulse; acquisition time 2.7 s; relaxation delay 5.0 s; 400-800 transients (corresponding to an analysis time of 30-60 min). Broadband proton decoupling is achieved with a modified WALTZ16 sequence (BI-_WALTZ16_32 by Bruker).

In the table below, properties of the polymerisations and the obtained polymers are presented, wherein the catalyst activity is presented as $R_p$, the polymerisation rate in kg polymer produced per mmol catalyst per mol of ethylene in the reactor diluent per hour. $M_n$ is the number-average molecular weight in kg/mol. $M_w$ is the weight-average molecular weight in kg/mol. PDI is the polydispersity $M_w/M_n$. $M_n$ and $M_w$ are determined according to the GPC method as described above. $[H]_{cop}$ is the quantity of 1-hexene incorporation, in mol % hexene in the copolymer. The experiments were conducted at a total reactor pressure of 0.9 MPa, using a 1-hexene concentration of 1.0 vol % in the diluent, at 80° C., using methylaluminoxane (MAO) as activator. The MAO was pretreated with BHT in such amount that the molar ratio of BHT to the residual amount of tri-methylaluminium in the MAO was 2:1. The aluminium (from the MAO solution) concentration in the reactor was 2 mmol/l.

Wherein the abbreviations are as described above, and [mmmm] indicates the isotactic pentad quantity as measured by $^{13}$C-NMR, expressed in mol %.

Of a selection of the catalysts, the performance in copolymerisation using vinyl cyclohexane (VCH) as example of a sterically encumbered comonomer with ethylene, at a pressure of 0.45 MPa, at temperature of 80° C., supplying 10 vol % of VCH in the diluent. The results are presented in the table below.

| ID | $R_p$ | $M_n$ | $M_w$ | PDI | $[VCH]_{copol}$ |
|---|---|---|---|---|---|
| I-5 | 123 | 91 | 196 | 2.2 | 20.7 |
| I-6 | 147 | 292 | 663 | 2.3 | 22.0 |
| I-11 | 128 | 815 | 1975 | 2.4 | 21.1 |
| I-12 | 180 | 288 | 645 | 2.2 | 15.3 |

| ID | $R_p$ | $M_n$ | $M_w$ | PDI | $[H]_{cop}$ | ID | $R_p$ | $M_n$ | $M_w$ | PDI | $[H]_{cop}$ |
|---|---|---|---|---|---|---|---|---|---|---|---|
| I-2 | 128 | 27 | 52 | 1.9 | 2.1 | I-14 | 107 | 162 | 366 | 2.3 | 4.5 |
| I-4 | 122 | 541 | 1649 | 3.0 | 3.0 | I-15 | 80 | 377 | 1148 | 3.0 | 2.2 |
| I-5 | 334 | 839 | 2405 | 2.9 | 3.0 | I-16 | 11 | 191 | 816 | 4.3 | 1.7 |
| I-6 | 1349 | 799 | 2307 | 2.9 | 3.6 | I-17 | 582 | 605 | 2605 | 4.3 | 2.0 |
| I-7 | 32 | 106 | 253 | 2.4 | 1.0 | I-18 | 849 | 961 | 2843 | 3.0 | 2.0 |
| I-8 | 471 | 77 | 177 | 2.3 | 3.2 | I-19 | 632 | 675 | 2548 | 3.8 | 1.3 |
| I-9 | 2684 | 750 | 2722 | 3.6 | 0.8 | I-20 | 158 | 42 | 84 | 2.0 | 3.4 |
| I-10 | 2169 | 1393 | 3067 | 2.2 | 0.9 | I-21 | 2619 | 511 | 2089 | 4.1 | 1.0 |
| I-11 | 135 | 459 | 1951 | 4.2 | 1.6 | I-22 | 6360 | 562 | 1724 | 3.1 | 2.3 |
| I-12 | 2390 | 527 | 1988 | 3.8 | 1.5 | I-23 | 40 | 66 | 640 | 9.7 | 3.9 |
| I-13 | 101 | 101 | 227 | 2.2 | 3.2 | I-24 | 1440 | 60 | 125 | 2.1 | 3.9 |

The above results illustrate that the compounds according to the invention display high activity in ethylene polymerisation, combined with achieving an excellent molecular weight of the polymer that is obtained, and a desirably high comonomer incorporation.

Using the compounds indicated above as comparative, a polymerisation experiment was performed as presented in the table below.

| ID | $R_p$ | $M_n$ | $M_w$ | PDI | $[H]_{cop}$ |
|---|---|---|---|---|---|
| C-3 | <0.01 | — | — | — | — |
| C-4 | 7 | 91 | 197 | 2.2 | 1.7 |
| C-5 | * | — | — | — | — |
| C-6 | 20 | 25 | 50 | 2.0 | 2.3 |

* no polymerisation activity could be detected

For a number of the inventive compounds, propylene polymerisation experiments were conducted, at a reactor pressure of 0.55 MPa at 60° C., using 2.0 mM TiBAVBHT complex and a molar ratio of TTB to catalyst of 10. The results are presented in the table below.

| ID | $R_p$ | $M_n$ | $M_w$ | PDI | [mmmm] |
|---|---|---|---|---|---|
| I-1 | 4 | 126 | 264 | 2.1 | 6.1 |
| I-2 | 8 | 20 | 36 | 1.8 | 4.5 |
| I-3 | 4 | 31 | 57 | 1.8 | 6.3 |
| I-4 | 8 | 398 | 854 | 2.1 | |
| I-5 | 38 | 1403 | 4363 | 3.1 | 40.7 |
| I-6 | 75 | 2471 | 5184 | 2.1 | 33.4 |

The copolymerisations of ethylene with vinyl cyclohexane illustrate the desirably high incorporation of the sterically encumbered olefins by using the inventive compounds as catalysts.

Comparative examples were conducted using the compounds C-1 and C-2 in ethylene/VCH copolymerisations according to the conditions as set out above, the result of which are presented in the table below.

| ID | $R_p$ | $M_n$ | $M_w$ | PDI | $[VCH]_{copol}$ |
|---|---|---|---|---|---|
| C-1 | 154 | 178 | 648 | 3.6 | 18.1 |
| C-2 | 102 | 656 | 2167 | 3.3 | 7.9 |

Comparing these results to the results of the experiments using the inventive compounds, it can be observed that using the inventive compounds as catalysts, one can produce an ethylene/VCH copolymer at high rates of polymerisation, with high molecular weight, combined with high incorporation of the comonomer.

Additional experiments were performed using the sterically encumbered comonomer vinyl-cyclohexane (VCH) as comonomer. The polymerisation conditions in this case were 0.9 MPa ethylene pressure, at 80° C., using 2 and 5 vol % of VCH in the diluent of the PPR cell, indicated in the table below as [VCH]. The catalysts were activated by MAO/BHT.

| ID | [VCH] | $R_p$ | $M_n$ | $M_w$ | PDI | $[VCH]_{copol}$ |
|---|---|---|---|---|---|---|
| C-2 | 2 | 8025 | n.d | n.d | n.d | 0.6 |
| C-2 | 5 | 3783 | 918 | 2220 | 2.4 | 1.5 |

| ID | [VCH] | $R_p$ | $M_n$ | $M_w$ | PDI | $[VCH]_{copol}$ |
|---|---|---|---|---|---|---|
| I-18 | 2 | 14852 | n.d | n.d | n.d | 0.6 |
| I-18 | 5 | 8292 | 727 | 1966 | 2.7 | 1.9 |

Further, for a selection of the compounds, polymerisation experiments were performed under high-temperature conditions, at a temperature of 170° C., using tri-n-octyl-aluminium as scavenger, TTB as activator, at a total pressure of 2.6 MPa, using 1-octene as comonomer in ethylene polymerisation. In the table below, the results of such experiments are presented, wherein [C8] indicates the vol % of 1-octene in the diluent and Rp indicates activity, in this case expressed as g polymer/(μmolcat*[C2H4]).

| ID | [C8] | $R_p$ | $M_w$ |
|---|---|---|---|
| I-5 | 0 | 1.5 | 37 |
|  | 3 | 2.0 | 39 |
|  | 6 | 1.5 | 71 |
| I-6 | 0 | 0.5 | 93 |
|  | 3 | 0.3 | 68 |
|  | 6 | 1.3 | 123 |

These experiments show that the inventive compounds may also be applied as catalysts in high-temperature solutions processes for the polymerisation of ethylene.

Further, the compound 1-18 was used in copolymerisation experiments using different activators and different chain transfer agents (CTA) at a total pressure of 1.0 MPa in the reactor and using 2 vol % hexene as comonomer at 80° C. As the boron-containing activator, N,N-dimethylanilinium tetrakispentafluorphenylborate (AB) was used in a B/Zr molar ratio of 2, in combination with 1 mmol/TiBAI. As CTA, hydrogen or diethylzinc (ZnEt$_2$) was used. Diethylzinc was used in two different molar ratios of Zn/Zr.

| Activator | CTA | CTA amount | $R_p$ | $M_n$ | $M_w$ | PDI | $[H]_{copol}$ |
|---|---|---|---|---|---|---|---|
| MAO/BHT | — | — | 2885 | 626 | 2591 | 4.1 | 2.2 |
| MAO/BHT | H$_2$ | 0.1 MPa | 1454 | 119 | 491 | 4.1 | 5.6 |
| MAO/BHT | ZnEt$_2$ | 50:1 Zn/Zr | 3545 | 326 | 933 | 2.9 | 2.9 |
| MAO/BHT | ZnEt$_2$ | 1001 Zn/Zr | 3741 | 191 | 498 | 2.6 | 2.8 |
| AB/TiBAI | — | — | 12016 | 121 | 321 | 2.7 | 3.1 |

The invention claimed is:

1. A compound according to formula 1:

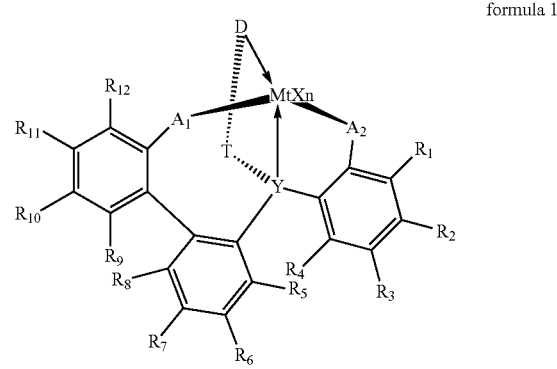

formula 1 wherein:
each of $R_1$ to $R_{12}$ is individually a moiety selected from hydrogen, an aryl moiety, an aryl moiety, a halogen, an alkyl or aryl moiety with halogen substituent(s), an alkoxy moiety, a siloxy moiety, or a nitrogen-containing moiety, wherein each R moiety may optionally form a ring structure with an adjacent R moiety;

each of $A_1$ and $A_2$ is individually a moiety selected from:
an element of Group 16 of the periodic system; and
a moiety containing an element of Group 15 of the periodic system;

T is a divalent hydrocarbyl moiety;

D is a substituted element of Group 15 or Group 16 of the periodic system;

Y is an element selected from Group 15 of the periodic system;

Mt is a transition metal;

X is a sigma-bonded ligand; and n is the amount of X ligands bonded to Mt.

2. The compound according to claim 1, wherein each of $R_1$ and $R_{12}$ is individually selected to be a moiety selected from t-butyl, adamantyl, 9H-carbazole-9-yl, hydrogen, and phenyl.

3. The compound according to claim 1, wherein $R_1$ and $R_{12}$ are the same or wherein $R_1$ and $R_{12}$ are different.

4. The compound according to claim 1, wherein each of $R_3$ and $R_{10}$ is individually selected to be a moiety selected from hydrogen, t-butyl and methyl.

5. The compound according to claim 1, wherein each of $R_2$, $R_4$, $R_5$, $R_6$, $R_7$, $R_8$, $R_9$ and $R_{11}$ is hydrogen.

6. The compound according to claim 1, wherein T is selected from an ethylene moiety (—CH$_2$—CH$_2$—) and a n-propylene moiety (—CH$_2$—CH$_2$—CH$_2$—).

7. The compound according to claim 1, wherein Y is nitrogen.

8. The compound according to claim 1, wherein:
D is O(CH$_3$) or N(CH$_3$)$_2$;
T is ethyl or n-propyl;
Y is N;
$A_1$ is O or N(p-tolyl); and
$A_2$ is O or N(p-tolyl).

9. A catalyst system comprising a compound according to claim 1.

10. The catalyst system according to claim 9, further comprising an activator, wherein the activator is selected from an aluminoxane compound and a boron-based compound, optionally in the presence of an aluminium alkyl compound.

11. The catalyst system according to claim 10, wherein the aluminoxane compound is selected from a methyl aluminoxane, an isobutyl aluminoxane, and a methyl-isobutyl aluminoxanes; or wherein the boron-based compound is selected from a tris(pentafluorophenyl) borane and a tetrakis (pentafluorophenyl) borate.

12. The catalyst system according to claim 9, wherein the catalyst system comprises the compound carried on a support material, wherein the support material is selected from a polymeric support material, a clay material, a solid aluminoxanes, or an inorganic oxide.

13. A process for the polymerisation of olefins, comprising polymerizing olefins in the presence of a catalyst system according to claim 9.

14. The process according to claim 13, wherein the process is a homopolymerisation process of ethylene, a homopolymerisation process of propylene, a copolymerisation process of ethylene with a comonomer, or a copolymerisation process of propylene with a comonomer.

15. The process according to claim 13, wherein the process is a gas-phase process, a solution process, or a slurry process.

16. The compound of claim 1, wherein $A_1$ and $A_2$ are independently O or $NR_{13}$, wherein $R_{13}$ is an alkyl, aryl or aralkyl moiety.

17. The compound of claim 1, wherein D is an $N(R_{14})_2$ or $OR_{14}$ moiety, in which $R_{14}$ is an alkyl moiety, an aryl moiety, or an aralkyl moiety.

* * * * *